s010440697B2

United States Patent
Yang et al.

(10) Patent No.: US 10,440,697 B2
(45) Date of Patent: Oct. 8, 2019

(54) METHOD AND APPARATUS FOR COORDINATION INFORMATION TRANSMISSION IN MOBILE COMMUNICATIONS

(71) Applicant: MediaTek Inc., Hsinchu (TW)

(72) Inventors: Weidong Yang, San Jose, CA (US); Bo-Si Chen, Hsinchu (TW); Chien-Chang Li, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/852,143

(22) Filed: Dec. 22, 2017

(65) Prior Publication Data

US 2018/0184419 A1 Jun. 28, 2018

Related U.S. Application Data

(60) Provisional application No. 62/438,985, filed on Dec. 23, 2016.

(51) Int. Cl.
    *H04W 72/04* (2009.01)
    *H04W 4/70* (2018.01)
    *H04L 5/00* (2006.01)

(52) U.S. Cl.
    CPC ......... *H04W 72/0413* (2013.01); *H04W 4/70* (2018.02); *H04W 72/0446* (2013.01); *H04L 5/0055* (2013.01); *H04W 72/042* (2013.01)

(58) Field of Classification Search
    None
    See application file for complete search history.

(56) References Cited

U.S. PATENT DOCUMENTS

| 8,682,313 B2 | 3/2014 | Kim et al. |
| 2011/0136494 A1* | 6/2011 | Kim ............... H04W 72/0426 455/450 |
| 2012/0051319 A1 | 3/2012 | Kwon et al. |
| 2015/0256401 A1* | 9/2015 | Zinger ............... H04L 41/14 370/401 |

(Continued)

FOREIGN PATENT DOCUMENTS

WO    WO 2010102456 A1    9/2010

OTHER PUBLICATIONS

State Intellectual Property Office, International Search Report and Written Opinion regarding ntemational Patent Application No. PCT/CN2017/117989, dated Mar. 21, 2018.

(Continued)

*Primary Examiner* — Anh Ngoc M Nguyen
(74) *Attorney, Agent, or Firm* — Han IP PLLC; Andy M. Han

(57) ABSTRACT

Various solutions for coordination information transmission with respect to user equipment (UE) and network apparatus in mobile communications are described. A UE may receive downlink control information comprising coordination information from a first node of a wireless network. The coordination information may comprise interference management information. The UE may copy the coordination information and embed the coordination information in uplink control information. The UE may further transmit the uplink control information to a second node of the wireless network.

14 Claims, 3 Drawing Sheets

(56) References Cited

U.S. PATENT DOCUMENTS

2018/0063820 A1* 3/2018 Xiong ................ H04W 72/042

OTHER PUBLICATIONS

Mediatek Inc., Interference management techniques for dynamic TDD, 3GPP TSG RAN WG1 Meeting NR Ad Hoc, R1-1700156, Jan. 16, 2017.
Mediatek Inc., Considerations on interference management in NR, 3GPP TSG RAN WG1 Meeting #87, R1-1612124, Nov. 14, 2016.
Taiwan Intellectual Property Office, Office Action for Taiwan Patent Application No. 106145520, dated Oct. 18, 2018.
Taiwan Intellectual Property Office, Office Action for Taiwan Patent Application No. 106145520, dated May 20, 2019.

* cited by examiner

METHOD AND APPARATUS FOR COORDINATION INFORMATION TRANSMISSION IN MOBILE COMMUNICATIONS

CROSS REFERENCE TO RELATED PATENT APPLICATION

The present disclosure claims the priority benefit of U.S. Provisional Patent Application No. 62/438,985, filed on 23 Dec. 2016, the content of which is incorporated by reference in its entirety.

TECHNICAL FIELD

The present disclosure is generally related to mobile communications and, more particularly, to coordination information transmission with respect to user equipment and network apparatus in mobile communications.

BACKGROUND

Unless otherwise indicated herein, approaches described in this section are not prior art to the claims listed below and are not admitted as prior art by inclusion in this section.

In wireless communication environment, the wireless signals transmitted or broadcasted by a node of a wireless network may cause interferences to neighbor nodes within neighbor areas. In order to prevent potential interferences, the plurality of nodes within neighbor areas may have to communicate and negotiate with each other to properly arrange radio resources. Accordingly, coordination information exchange among the plurality of nodes may be needed for interference management. The coordination information may comprise, for example and without limitation, slot format, uplink/downlink traffic amount, uplink/downlink resource split, channel state information (CSI) feedback, etc.

In conventional communication networks, majority interference management schemes use signaling or communication between nodes over backhaul. In newly developed communication networks, the request to have backhaul links among nodes to enable interference management may make network deployment challenging. Also, it remains uncertain whether information exchange among nodes through backhaul links is feasible or fast enough to alleviate more dynamic interferences in future communication networks. From those considerations, over-the-air (OTA) signaling among base stations may be considered. The OTA signaling may carry coordination information to facilitate scheduling coordination among cells. However, the OTA signaling may suffer frequency fading effect or signal strength decay in propagation. If two nodes are deployed far from each other or there exists obstacles between the nodes, the channel conditions may be bad and the OTA signaling may not be well exchanged between the nodes.

Accordingly, it is important to properly perform interference management via OTA signaling. Therefore, in developing future communication systems, it is needed to provide proper mechanisms for exchanging coordination information by OTA signaling among a plurality of nodes.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to coordination information transmission among a plurality of nodes with respect to with respect to user equipment and network apparatus in mobile communications.

In one aspect, a method may involve a first node of a wireless network transmitting an alert signal to a second node of the wireless network. The method may also involve the first node performing a mini-slot transmission to the second node. The alert signal indicates presence of the mini-slot transmission.

In one aspect, a method may involve an apparatus receiving downlink control information comprising coordination information from a first node of a wireless network. The method may also involve the apparatus copying the coordination information and embedding the coordination information in uplink control information. The method may further involve the apparatus transmitting the uplink control information to a second node of the wireless network.

In one aspect, an apparatus may comprise a transceiver capable of wirelessly communicating with a plurality of nodes of a wireless network. The apparatus may also comprise a processor communicatively operably coupled to the transceiver. The processor may be capable of receiving downlink control information comprising coordination information from a first node of the wireless network. The processor may also be capable of copying the coordination information and embedding the coordination information in uplink control information. The processor may further be capable of transmitting the uplink control information to a second node of the wireless network.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR) and Internet-of-Things (IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Figure 1:
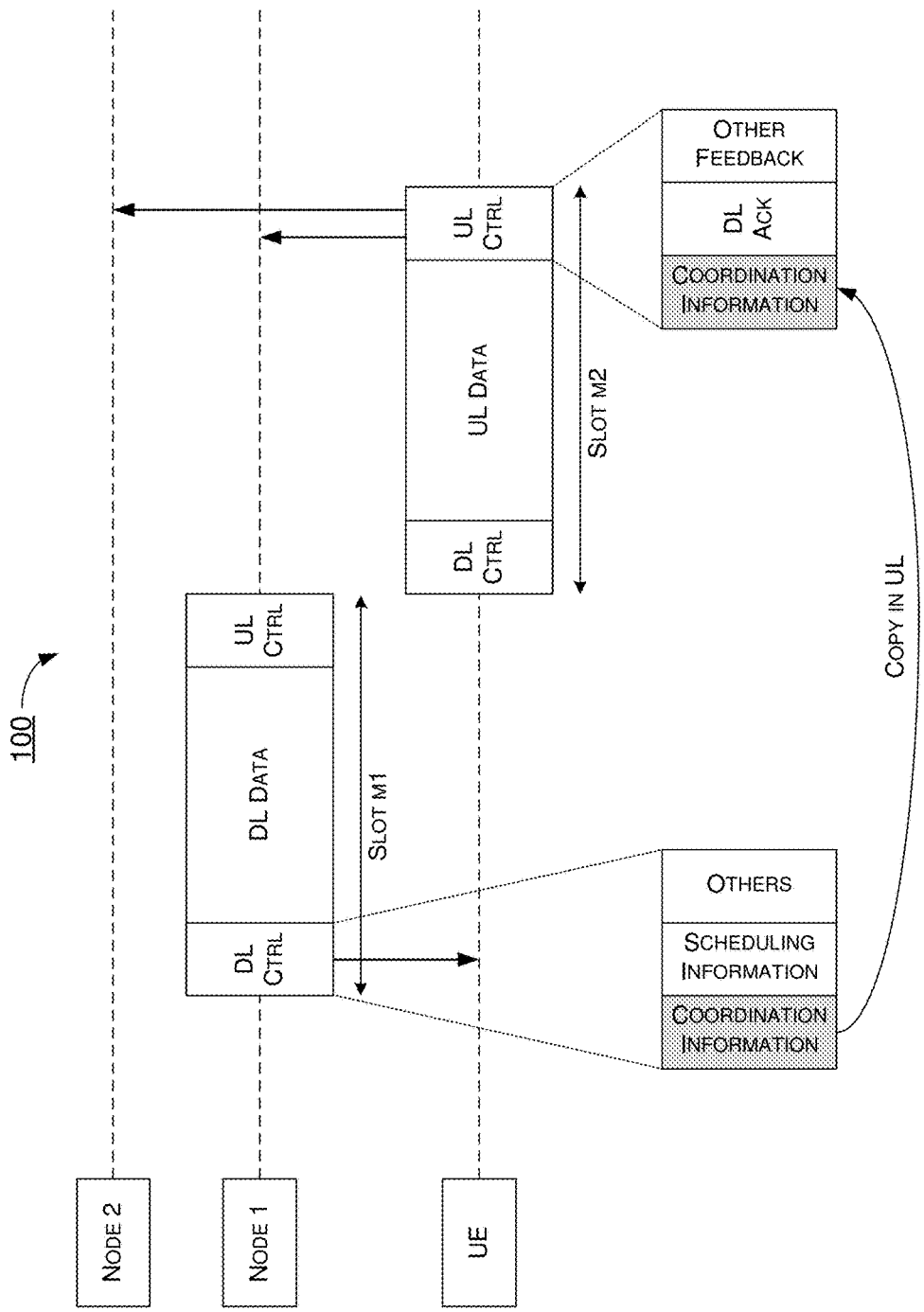
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to coordination information transmission with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Under proposed schemes in accordance with the present disclosure, exchange of coordination information may occur among a plurality of nodes in a wireless network. Each node in the wireless network may be a network apparatus (e.g., a base station (BS)) or a communication apparatus (e.g., a user equipment (UE)), and a UE may be engaged in communication with a BS, another UE, or both, at a given time. Thus, the exchange of coordination information may take place in three types of node pairs: BS-BS, BS-UE and UE-UE. Herein, a BS may be an eNB in an LTE-based network of a gNB in a 5G/NR network.

The plurality of nodes may be capable of wirelessly communicating with each other via wireless signals. In wireless communication environment, the wireless signals transmitted or broadcasted by a node of a wireless network may cause interferences to neighbor nodes within neighbor areas. In order to prevent or mitigate potential interferences, interference management schemes are important in wireless communication network. The plurality of nodes within neighbor areas may have to communicate and negotiate with each other to properly arrange radio resources for interference management. Accordingly, coordination information exchange among the plurality of nodes may be needed. The coordination information may comprise, for example and without limitation, slot format, uplink/downlink traffic amount, uplink/downlink resource split, channel state information (CSI) feedback, etc.

In LTE, majority interference management schemes use signaling or communication between eNBs over backhaul. In NR, the request to have backhaul links among gNBs to enable interference management may make network deployment challenging. Also, it remains uncertain whether information exchange among gNBs through backhaul links is feasible or fast enough to alleviate more dynamic interferences in NR. From those considerations, over-the-air (OTA) signaling among base stations may be considered. The OTA signaling may carry coordination information to facilitate scheduling coordination among cells. However, the OTA signaling may suffer frequency fading effect or signal strength decay in propagation. If two gNBs are deployed far from each other or there exists obstacles between the gNBs, the channel conditions may be bad and the OTA signaling may not be well exchanged between the gNBs. According, various solutions are proposed in the present disclosure to provide alternative approaches for transmitting the coordination information.

FIG. 1 illustrate an example scenario 100 under schemes in accordance with implementations of the present disclosure. Scenario 100 involves a UE, a first node (e.g., node 1) and a second node (e.g., node 2), which may be a part of a wireless communication network (e.g., a Long-Term Evolution (LTE) network, a LTE-Advanced network, a LTE-Advanced Pro network, a $5^{th}$ Generation (5G) network, a New Radio (NR) network or an Internet of Things (IoT) network). The UE may be capable of wirelessly communicating with the first node and the second node via wireless signals. The first node may be a serving cell of the UE and the second node may be a neighbor cell. In order to perform interference management, the first node may need to exchange coordination information with the second node. In addition to directly transmitting the coordination information to the second node, the first node may be capable of transmitting the coordination information to the second node via the UE. In other words, the UE may be capable of bouncing or reflecting the coordination information from the first node to the second node.

As showed in FIG. 1, the first node may be configured to perform downlink/uplink (DL/UL) transmission with the UE in slot m1. The slot format of slot m1 may comprise a downlink control region, a downlink data region and an uplink control region. The first node may be able to transmit downlink control information and downlink data to the UE in slot m1. The downlink control information may comprise the coordination information, the scheduling information for the UE and other control information. The UE may be configured to receive the downlink control information from the first node. After receiving the downlink control information, the UE may be configured to copy or repeat the coordination information carried in the downlink control information. Then, the UE may be configured to embed the coordination information in the uplink control information. The UE may be further configured to transmit the uplink control information to the second node in slot m2. The second node may be configured to sniff the uplink transmission from the UE. Accordingly, the second node may be able to receive the coordination information of the first node through the UE. The coordination information may comprise interference management information from the first node.

On the other hand, the UE may be further configured to transmit the uplink control information to the first node in slot m2. The slot format of slot m2 may comprise a downlink control region, an uplink data region and an uplink control region. The uplink control information may be transmitted in the uplink control region of slot m2. The uplink control information may further comprise the acknowledge information and other feedback information for the first node. The acknowledge information may be the hybrid automatic repeat request (HARQ) ACK/NACK for the downlink data transmission from the first node. The feedback information may be, for example and without limitation, channel state information (CSI) feedback for the first node. In this example, the coordination information is transmitted along with the acknowledge information and other feedback information. In some implementations, the coordination information may also be transmitted alone or in a separate uplink channel.

In some implementations, the first node may be configured to transmit at least one of an indication and a configuration to the UE for indicating the UE to bounce the coordination information. The indication and/or the configuration may be carried in the downlink control information or may be transmitted separately. The indication and/or the configuration may also be transmitted to the UE via radio resource control (RRC) signaling. After receiving the indication and/or the configuration, the UE may be aware of that it should bounce the coordination information (i.e., copy and transmit the coordination information) to other nodes.

In some implementations, the slot m2 may be adjacent to the slot m1 or may be separate from the slot m1 by a gap. The UE may be configured to bounce the coordination information in a next slot after the slot of receiving the coordination information. Alternatively, the UE may also be configured to bounce the coordination information in a separate slot after a gap from the slot of receiving the coordination information. The length of the gap may be proper designed according to practical requirements or may be indicated by the first node.

In some implementations, the UE may not have to understand the contents of the coordination information when bouncing the coordination information in uplink transmission. Since the coordination information is used and exchanged between the nodes, the UE may not need to understand or process the coordination information. In other words, the UE may not need to decode, demodulate or modify the coordination information. The UE may solely copy the contents of the coordination information without any processing and include the coordination information in uplink transmission. Accordingly, such mechanism may be useful for a Release-15 (Rel-15) 5G UE to bounce the downlink control information from a Release-16 (Rel-16) 5G network. The UE may understand part of the contents of the bounced signaling but not all of them. This may not be a problem since the bounced signaling may be useful to other nodes (e.g., Rel-16 nodes).

In some implementations, the UEs at cell edge of a node may have better chance to reach other nodes than the UEs at cell center. Therefore, the UEs at cell edge may have high possibility to be selected by the node to bounce the coordination information. The node may be configured to select and send at least one of indications and configurations to the UEs at cell edge for bouncing the coordination information.

Illustrative Implementations

Figure 2:
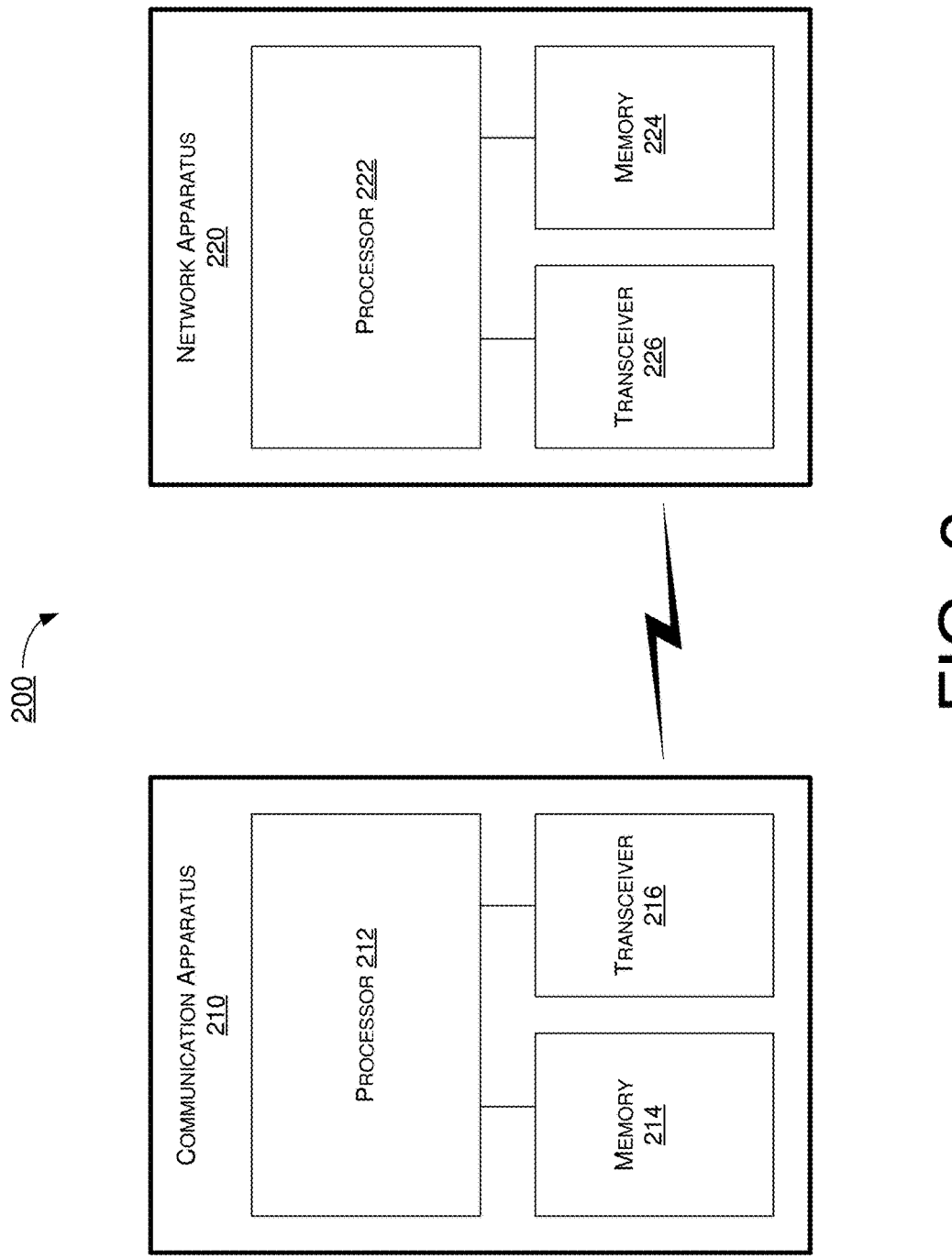
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to coordination information transmission with respect to user equipment and network apparatus in wireless communications, including scenario 100 described above as well as processes 300 described below.

Communication apparatus 210 may be a part of an electronic apparatus, which may be a user equipment (UE) such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, or one or more complex-instruction-set-computing (CISC) processors. Communication apparatus 210 may include at least some of those components shown in FIG. 2 such as a processor 212, for example. Communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in a LTE, LTE-Advanced or LTE-Advanced Pro network or in a gNB in a 5G, NR or IoT network. Alternatively, network apparatus 220 may be implemented in the form of one or more IC chips such as, for example and without limitation, one or more single-core processors, one or more multi-core processors, or one or more CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 620 may further include a memory 624 coupled to processor 222 and capable of being accessed by processor 222 and storing data therein. Accordingly, communication apparatus 210 and network apparatus 220 may wirelessly communicate with each other via transceiver 216 and transceiver 226, respectively. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE and network apparatus 220 is implemented in or as a network node of a communication network.

In some implementations, processor 212 may be configured to wirelessly communicate, via transceiver 216, with network apparatus 220 and other network apparatus via wireless signals. Network apparatus 220 may be a serving cell of communication apparatus 210 and the other network apparatus be a neighbor cell. In order to perform interference management, network apparatus 220 may need to exchange coordination information with one or more other network apparatus. In addition to directly transmitting the coordination information to the second node, network apparatus 220 may be capable of transmitting the coordination information to other network apparatus via communication apparatus 210. In other words, communication apparatus 210 may be capable of bouncing or reflecting the coordination information from network apparatus 220 to one or more other network apparatus.

In some implementations, processor 222 may be configured to perform downlink/uplink (DL/UL) transmission with communication apparatus 210 in a first slot. Processor 222 may be able to transmit, via transceiver 226, downlink control information and downlink data to communication apparatus 210 in the first slot. The downlink control information may comprise the coordination information, the scheduling information for communication apparatus 210 and other control information. Processor 212 may be configured to receive, via transceiver 216, the downlink control information from network apparatus 220. After receiving the downlink control information, processor 212 may be configured to copy or repeat the coordination information carried in the downlink control information. Then, processor 212 may be configured to embed the coordination information in the uplink control information. Processor 212 may be further configured to transmit, via transceiver 216, the uplink control information to one or more other network apparatus in a second slot. Other network apparatus may be configured to sniff the uplink transmission from communication apparatus 210. Accordingly, other network apparatus may be able to receive the coordination information of network apparatus 220 through communication apparatus 210. The coordination information may comprise interference management information from network apparatus 220.

In some implementations, processor 212 may be further configured to transmit, via transceiver 216, the uplink control information to network apparatus 220 in the second slot. Processor 212 may transmit the uplink control information in the uplink control region of the second slot. The uplink control information may further comprise the acknowledge information and other feedback information for network apparatus 220. The acknowledge information may be the hybrid automatic repeat request (HARQ) ACK/NACK for the downlink data transmission from network apparatus 220. The feedback information may be, for example and without limitation, channel state information (CSI) feedback for network apparatus 220. Processor 212 may transmit the coordination information along with the acknowledge information and other feedback information. Processor 212 may also transmit the coordination information alone or in a separate uplink channel.

In some implementations, processor 222 may be configured to transmit at least one of an indication and a configuration to communication apparatus 210 for indicating communication apparatus 210 to bounce the coordination information. Processor 222 may include the indication and/or the configuration in the downlink control information or may transmit the indication and/or the configuration separately. Processor 222 may also transmit the indication and/or the configuration to communication apparatus 210 via radio resource control (RRC) signaling. After receiving the indication and/or the configuration, processor 212 may be aware of that it should bounce the coordination information (i.e., copy and transmit the coordination information) to one or more other network apparatus.

In some implementations, the second slot may be adjacent to the first slot or may be separate from the first slot by a gap. Processor 212 may be configured to bounce the coordination information in a next slot after the slot of receiving the coordination information. Alternatively, processor 212 may also be configured to bounce the coordination information in a separate slot after a gap from the slot of receiving the coordination information. The length of the gap may be proper designed according to practical requirements or may be indicated by the first node.

In some implementations, processor 212 may not have to understand the contents of the coordination information when bouncing the coordination information in uplink transmission. Since the coordination information is used and exchanged between the network apparatus, processor 212 may not need to understand or process the coordination information. In other words, processor 212 may not need to decode, demodulate or modify the coordination information. Processor 212 may solely copy the contents of the coordination information without any processing and include the coordination information in uplink transmission. Accordingly, such mechanism may be useful for a Release-15 (Rel-15) 5G communication apparatus to bounce the downlink control information from a Release-16 (Rel-16) 5G network apparatus. The communication apparatus may understand part of the contents of the bounced signaling but not all of them. This may not be a problem since the bounced signaling may be useful to one or more other network apparatus (e.g., Rel-16 network apparatus).

In some implementations, the communication apparatus at cell edge of a network apparatus may have better chance to reach other network apparatus than the communication apparatus at cell center. Therefore, the communication apparatus at cell edge may have high possibility to be selected by the network apparatus to bounce the coordination information. The network apparatus may be configured to select and send at least one of indications and configurations to the communication apparatus at cell edge for bouncing the coordination information.

Illustrative Processes

Figure 3:
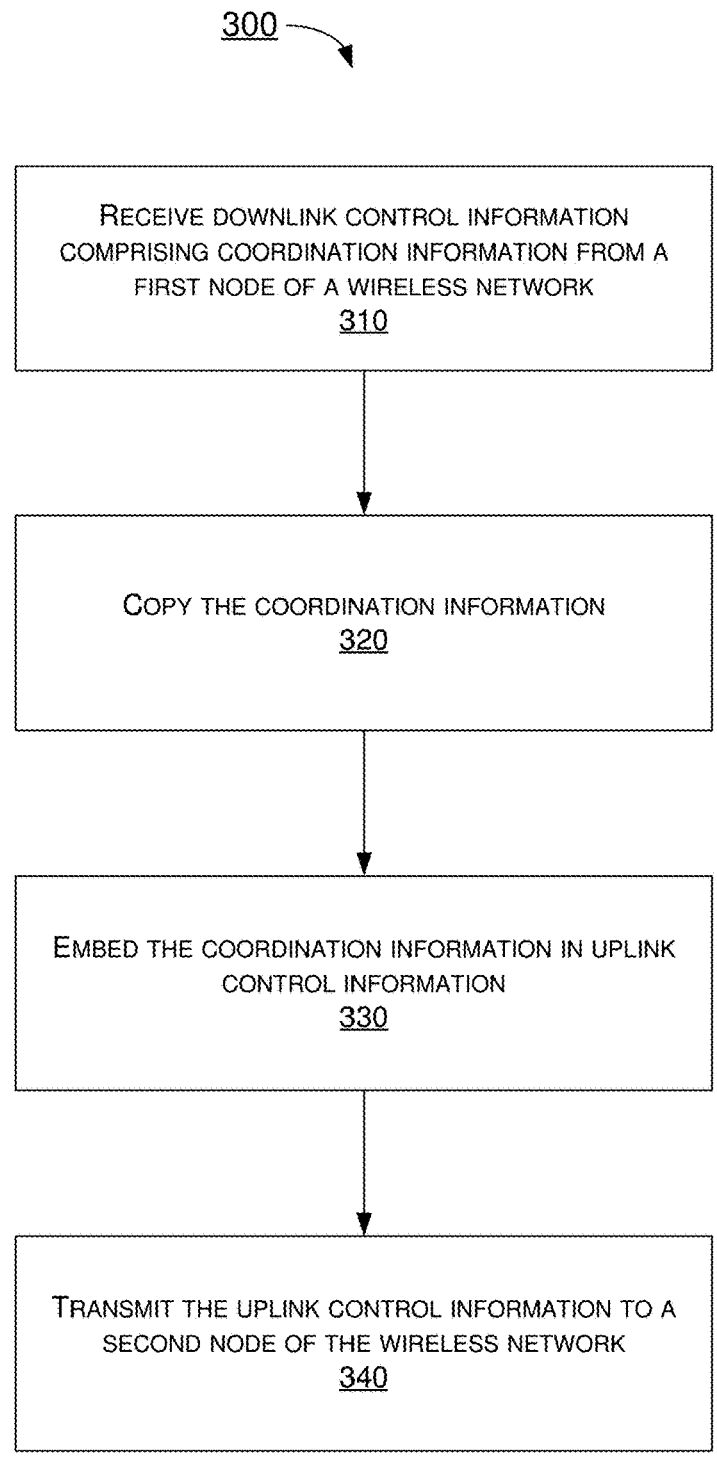
FIG. 3 is a flowchart of an example process in accordance with an implementation of the present disclosure.

FIG. 3 illustrates an example process 300 in accordance with an implementation of the present disclosure. Process 300 may be an example implementation of scenario 100, whether partially or completely, with respect to coordination information transmission in accordance with the present disclosure. Process 300 may represent an aspect of implementation of features of communication apparatus 210. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 310. Process 300 may begin at block 310.

At 310, process 300 may involve communication apparatus 310 receiving downlink control information comprising coordination information from a first node of a wireless network. Process 300 may proceed from 310 to 320.

At 320, process 300 may involve communication apparatus 310 copying the coordination information. Process 300 may proceed from 320 to 330.

At 330, process 300 may involve communication apparatus 310 embedding the coordination information in uplink control information. Process 300 may proceed from 330 to 340.

At 330, process 300 may involve communication apparatus 310 transmitting the uplink control information to a second node of the wireless network.

In some implementations, the downlink control information may further comprise at least one of an indication and a configuration for indicating communication apparatus 310 to bounce the coordination information. The coordination information may comprise interference management information.

In some implementations, process 300 may involve communication apparatus 310 receiving the downlink control information in a first slot and transmitting the uplink control information in a second slot. The uplink control information may further comprise the acknowledge information and other feedback information for the first node of the wireless network. The acknowledge information may be the hybrid automatic repeat request (HARQ) ACK/NACK for the downlink data transmission from the first node. The feedback information may be, for example and without limitation, channel state information (CSI) feedback for the first node. Process 300 may involve communication apparatus 310 transmitting the coordination information along with the acknowledge information and other feedback information. Process 300 may also involve communication apparatus 310 transmitting the coordination information alone or in a separate uplink channel.

In some implementations, process 300 may involve communication apparatus 310 transmitting the uplink control information to the first node. The uplink control information may further comprise acknowledge information or feedback information for the first node. The first node may be a serving cell of the apparatus. The downlink control information may further comprise scheduling information for communication apparatus 310 and other control information.

In some implementations, process 300 may involve communication apparatus 310 bouncing the coordination information in a next slot after the slot of receiving the coordination information. Alternatively, process 300 may also involve communication apparatus 310 bouncing the coordination information in a separate slot after a gap from the slot of receiving the coordination information.

In some implementations, process 300 may involve communication apparatus 310 not decoding, demodulating or modifying the coordination information. Process 300 may involve communication apparatus 310 copying the contents of the coordination information without any processing and including the coordination information in uplink transmission.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a processor of an apparatus, downlink control information in a first time slot, the downlink control information comprising coordination information from a first node of a wireless network;
   copying, by the processor, the coordination information;
   embedding, by the processor, the coordination information and acknowledge information or feedback information for the first node in uplink control information; and
   transmitting, by the processor, the uplink control information in a second time slot to both the first node and a second node of the wireless network.

2. The method of claim 1, wherein the downlink control information further comprises at least one of an indication and a configuration for indicating the apparatus to bounce the coordination information.

3. The method of claim 1, wherein the coordination information comprises interference management information.

4. The method of claim 1, wherein the receiving comprises receiving the downlink control information in a first slot, and wherein the transmitting comprises transmitting the uplink control information in a second slot.

5. The method of claim 1, wherein the first node comprises a serving cell of the apparatus.

6. The method of claim 1, wherein the downlink control information further comprises scheduling information for the apparatus.

7. The method of claim 1, wherein the coordination information is not modified by the processor in the copying, the embedding and the transmitting.

8. An apparatus, comprising:
   a transceiver capable of wirelessly communicating with a plurality of nodes of a wireless network; and
   a processor communicatively and operably coupled to the transceiver, the processor capable of:
      receiving, via the transceiver, downlink control information in a first time slot, the downlink control information comprising coordination information from a first node of the plurality of nodes;
      copying the coordination information;
      embedding the coordination information and acknowledge information or feedback information for the first node in uplink control information; and
      transmitting, via the transceiver, the uplink control information in a second time slot to both the first node and a second node of the plurality of nodes.

9. The apparatus of claim 8, wherein the downlink control information further comprises at least one of an indication and a configuration for indicating the apparatus to bounce the coordination information.

10. The apparatus of claim 8, wherein the coordination information comprises interference management information.

11. The apparatus of claim 8, wherein, in receiving the downlink control information, the processor receives the downlink control information in a first slot, and wherein, in transmitting the uplink control information, the processor transmits the uplink control information in a second slot.

12. The apparatus of claim 8, wherein the first node comprises a serving cell of the apparatus.

13. The apparatus of claim 8, wherein the downlink control information further comprises scheduling information for the apparatus.

14. The apparatus of claim 8, wherein the processor does not modify the coordination information.

* * * * *